Aug. 9, 1938.  M. W. BOWEN  2,125,986
PISTON FOR PRESSURE PRODUCING DEVICES
Filed Feb. 27, 1936
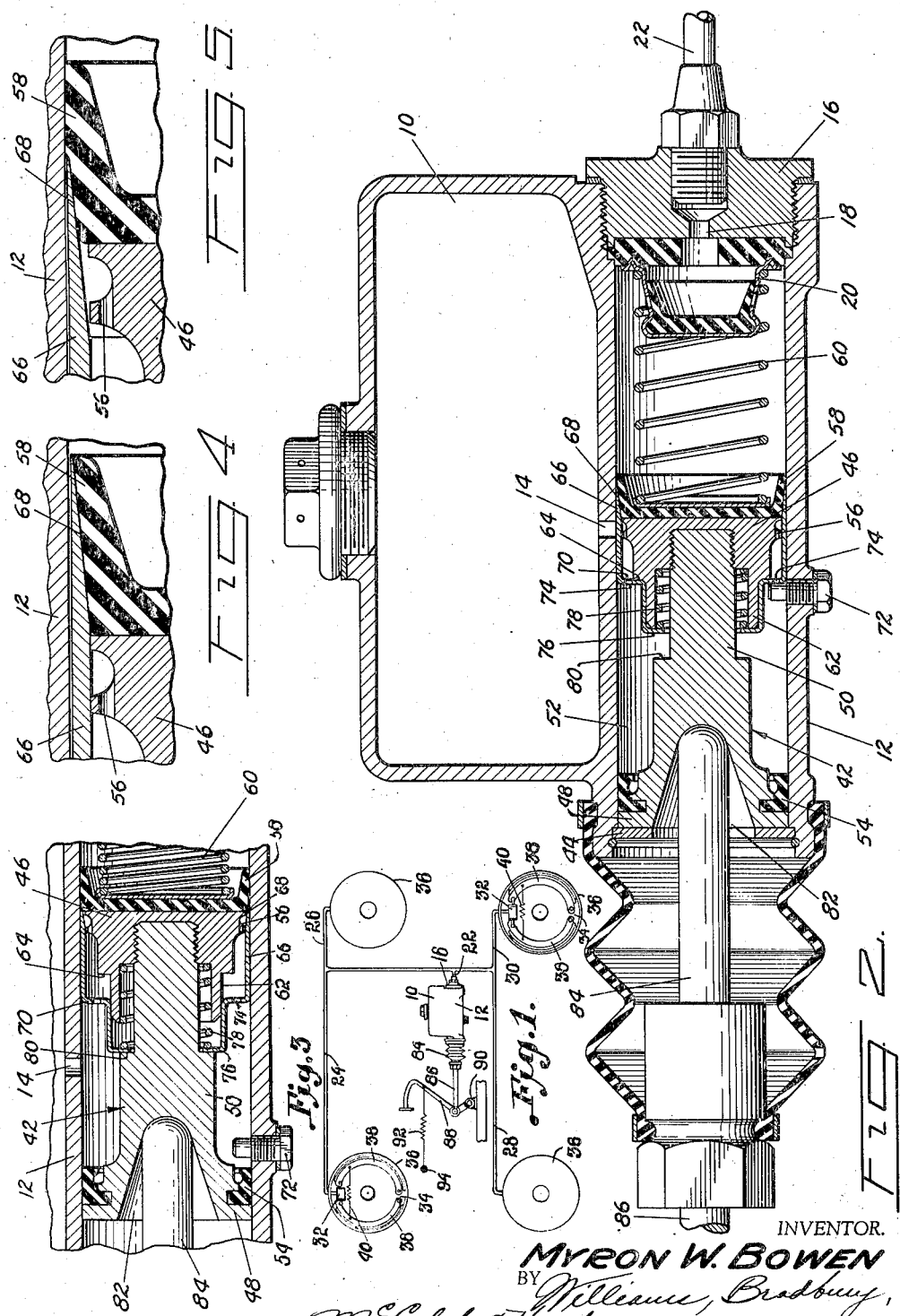
INVENTOR.
MYRON W. BOWEN
BY
ATTORNEYS.

Patented Aug. 9, 1938

2,125,986

UNITED STATES PATENT OFFICE 2,125,986

PISTON FOR PRESSURE PRODUCING DEVICES

Myron W. Bowen, Detroit, Mich., assignor to Hydraulic Brake Company, Detroit, Mich., a corporation of California Application February 27, 1936, Serial No. 65,976

9 Claims. (Cl. 60—54.6)

This invention relates to fluid pressure producing devices, and more particularly to pistons for such devices.

Broadly the invention comprehends a fluid pressure producing device including a cylinder, a piston reciprocable therein, a flexible cup on the head of the piston, and means for saving the cup from injury.

An object of the invention is to provide a piston carrying a flexible cup, with a shell for the protection of the cup.

Another object of the invention is to provide a piston having a flexible cup on its head, with a protective shell movable relative to the piston and the cup.

Another object of the invention is to provide a cylinder, a piston reciprocable therein, a flexible cup on the head of the piston, and a movable shell intermediate the head of the piston and cup and the wall of the cylinder.

A further object of the invention is to provide a cylinder, a piston reciprocable therein having on its head a leak-proof cup and a protective shell reciprocable between the head of the piston and the cylinder embracing the cup and operative to uncover a portion of the cup on the compression stroke of the piston and to completely telescope the cup when the piston is fully retracted.

Other objects of the invention will appear from the following description taken in connection with the drawing which forms a part of this specification, and in which,—

Fig. 1 is a schematic view of a fluid pressure braking system embodying the invention;

Fig. 2 is a vertical longitudinal sectional view of the fluid pressure producing device;

Fig. 3 is a fragmentary view, in section, illustrating the piston on its compression stroke;

Fig. 4 is an enlarged fragmentary view illustrating the relation of the shiftable shell to the flexible cup when the piston is in fully retracted position; and Fig. 5 is an enlarged fragmentary view illustrating the relation of the shiftable shell and the flexible cup when the piston is on its compression stroke.

Referring to the drawing for more specific details of the invention, 10 represents a fluid reservoir of conventional type having at its base a cylinder 12. The cylinder is provided with a port 14 communicating with the reservoir, and a head 16 having an axial bore providing a discharge port 18 for the cylinder, the port being controlled as by a two-way valve 20.

A fluid pressure delivery pipe or conduit 22 suitably connected to the head in direct communication with the discharge port 18 has branches 24, 26, 28 and 30 connected respectively to fluid pressure actuated motors 32. The motors are preferably arranged in pairs, one pair for actuating the friction elements of brakes associated with the front wheels of the vehicle, and another pair for actuating brakes associated with the rear wheels of the vehicle.

As shown, the brakes are of conventional type including a fixed support or backing plate 34, a rotatable drum 36 associated therewith, a pair of corresponding interchangeable friction elements or shoes 38 pivoted on the backing plate, and a motor, such as the motor 32, mounted on the backing plate between the shoes and operative to move the shoes against the resistance of a retractile spring 40 into engagement with the drum 36.

A piston 42, reciprocable in the cylinder 12, is retained against displacement as by a washer 44 suitably secured in the open end of the cylinder. The piston has a detachable head 46, a skirt 48, and a reduced section 50, the latter providing in conjunction with the wall of the cylinder an annular chamber 52. The skirt of the piston carries a leak-proof washer 54 providing against seepage of fluid past the piston, and the head of the piston has a plurality of spaced ports 56 providing communications between the annular chamber 52 and that portion of the cylinder forward of the piston. A leak-proof cup 58 is seated on the head of the piston, and a spring 60 interposed between the cup 58 and the two-way valve 20 serves to retain these elements against displacement and also to return the piston to its retracted position.

The head 46 of the piston has on its back a concentric sleeve 62 telescoping a portion of the reduced section 50 of the piston, and the outer wall of this sleeve has a double diameter, the two diameters providing at their junction an annular shoulder 64. A shell 66 fitted in the cylinder 12 with small clearance is positioned intermediate the piston and the wall of the cylinder and is reciprocable relative to the cylinder and piston.

The forward end of the shell 66 has a tapered inner wall 68 embracing the cup 58. As shown, the shell has a double diameter providing at the junction of the two diameters an annular shoulder 70 adaptable for cooperation with the annular shoulder 64 of the sleeve 62 to limit the movement of the shell in one direction. The shoulder 70 seats on a stop 72 when the piston is in fully retracted position, and the shoulder 78 is provided with a plurality of spaced openings 74 preferably registering with the ports 56 in the head of the piston so as to provide for the free passage of fluid from the annular chamber 52 to the ports.

The rear end of that portion of the shell having the smaller diameter has a flange 76 extending inwardly beyond the free end of the sleeve 62, and a spring 78 sleeved on the reduced section 50 intermediate the back of the piston head and the flange 76 urges the shell toward an annular seat 80 when the piston is moved on its compression stroke. A recess 82 in the back of the piston receives one end of a thrust pin 84, the other end of which may be connected as by a rod 86 to a foot pedal lever 88 pivoted on a suitable support 90 and connected by a retractile spring 92 to a fixed support 94.

In operation, upon depressing the foot pedal lever 88 force is transmitted therefrom through the rod 86 and thrust pin 84 to the piston 42 resulting in moving the piston on its compression stroke. During the initial movement of the piston on its compression stroke the spring 78 retains the shell 66 against the stop 72, and as the piston advances the collapsible leak-proof cup 58 is moved from its position within the shell sufficiently forward of the shell to engage the major portion of its flange or lip with the wall of the cylinder so as to inhibit the passage of fluid from that portion of the cylinder 12 forward of the piston past the piston.

As the piston proceeds on its compression stroke, the shell seats on the annular shoulder 80, and the fluid in the cylinder forward of the piston is disp ed therefrom past the two-way valve 20 and through the fluid pressure delivery pipe or conduit 22 to the fluid pressure actuated motors 32, causing actuation of the motors with the resultant movement of the shoes 38 against the resistance of the springs 40 into engagement with the drums 36.

Upon release of the applied force, the piston 42 is returned to its retracted position under the influence of the spring 60. As the piston returns to its retracted position, a partial vacuum is created in the cylinder forward of the piston resulting in drawing fluid from the reservoir through the port 14 into the annular chamber 52, thence through the openings 74 in the shell 66 and the ports 56 in the head of the piston past the cup 58 into that portion of the cylinder forward of the piston. As the piston returns to its retracted position, the shell 66 engages the stop 72, and as the piston moves to its fully retracted position the collapsible leak-proof cup 58 is telescoped by the shell 66. During this operation fluid is returning to the cylinder 12 from the fluid pressure actuated motors 32 under the influence of retractile springs 40 connecting the respective pairs of shoes 38. Hence, the quantity of fluid received by the cylinder may be in excess of the quantity required to completely fill the cylinder. Under this condition, any excess fluid is returned to the reservoir by way of the clearance between the shell 66 and the wall of the cylinder and the port 14.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is—

1. A fluid pressure producing device comprising a cylinder, a piston reciprocable therein, said piston having a flexible sealing part, and a movable shell intermediate the piston and the cylinder for controlling the sealing action of said part.

2. A fluid pressure producing device comprising a cylinder, a piston reciprocable therein, means associated with said piston and adapted either to form a sealing contact with said cylinder or to permit by-passing of fluid therebetween, and a shell arranged intermediate the piston and the cylinder and movable relative to the piston and cylinder to control bypassing of said piston.

3. A fluid pressure producing device comprising a cylinder, a piston reciprocable therein and having a part adapted to form a fluid-tight seal therewith, a shell arranged intermediate the piston and cylinder to control said seal, means retaining the shell against movement relative to the cylinder during the initial movement of the piston on its compression stroke, and means for moving the shell and the piston in unison upon further advance of the piston on its compression stroke.

4. A fluid pressure producing device comprising a cylinder, a piston reciprocable therein and having a part adapted to form a seal therewith, a shell fitted in the cylinder with small clearance intermediate the piston and cylinder, said shell being adapted to control said seal, means retaining the shell against movement relative to the cylinder during the initial movement of the piston on its compression stroke, means for moving the shell and piston in unison as the piston proceeds on its compression stroke, means for returning the piston to its retracted position, and means for arresting the shell before the piston returns to its fully retracted position.

5. A fluid pressure producing device comprising a cylinder, a piston reciprocable therein, a flexible cup on the head of the piston, said cup being adapted to form a fluid tight seal between said piston and cylinder, and a shell for controlling said seal, said shell being intermediate the piston and cylinder movable relative to the piston and cylinder and embracing the cup.

6. A fluid pressure producing device comprising a cylinder, a piston movable therein, a flexible sealing cup on the head of the piston, and a shell surrounding the piston and cup and movable relative thereto to control the sealing action of said cup.

7. A fluid pressure producing device comprising a cylinder, a piston reciprocable therein, a flexible cup on the head of the piston, said cup being adapted to make a seal with said cylinder, means for advancing the piston, means for returning the piston, and a movable shell arranged intermediate the piston and the cylinder and embracing the cup and adapted to successively completely telescope the cup to break the seal between said cup and cylinder.

8. A fluid pressure producing device comprising a reservoir, a cylinder supplied therefrom, a piston reciprocable in the cylinder, a flexible cup on the head of the piston, said cup being adapted to form a fluid tight seal, means for advancing the piston, means for returning the piston, and a movable shell interposed between the piston and the cylinder and adapted to completely telescope the cup when the piston is moved to its fully retracted position whereby said seal is broken.

9. A fluid pressure braking system comprising a pressure producing device including a reservoir, a cylinder supplied therefrom, fluid pressure actuated motors connected to the cylinder, a piston reciprocable in the cylinder, a flexible cup on the head of the piston, said cup being adapted to form a fluid tight seal, means for advancing the piston, means for returning the piston, and a movable shell interposed between the piston and the cylinder adapted to completely telescope the cup when the piston is moved to its fully retracted position whereby said seal is broken.

MYRON W. BOWEN.